(12) United States Patent
Pollack (10) Patent No.: US 7,357,452 B2
(45) Date of Patent: Apr. 15, 2008

(54) RECLINE ADJUSTMENT APPARATUS

(75) Inventor: Thomas Pollack, West Chester, PA (US)

(73) Assignee: Graco Children's Products Inc., Exton, PA (US)

(*) Notice: Subject to any disclaimer, the term of this patent is extended or adjusted under 35 U.S.C. 154(b) by 85 days.

(21) Appl. No.: 11/079,890

(22) Filed: Mar. 15, 2005

(65) Prior Publication Data

US 2006/0208547 A1 Sep. 21, 2006

(51) Int. Cl.
*B60N 2/28* (2006.01)

(52) U.S. Cl. .............................. 297/256.13; 297/219.1; 5/655

(58) Field of Classification Search ........... 297/256.13, 297/256.16, 397, 284.5, 284.3, 229, 219.1, 297/223; 5/425, 655, 653, 634, 640, 639
See application file for complete search history.

(56) References Cited

U.S. PATENT DOCUMENTS

| | | | | | |
|---|---|---|---|---|---|
| 1,540,685 | A | * | 6/1925 | Eiband | 5/657 |
| 2,865,433 | A | * | 12/1958 | Warner | 383/25 |
| 3,109,474 | A | * | 11/1963 | Levi | 150/158 |
| 3,404,917 | A | * | 10/1968 | Smith | 297/256.1 |
| 3,707,008 | A | * | 12/1972 | Fellin et al. | 5/653 |
| 3,763,972 | A | * | 10/1973 | Karzmar | 190/8 |
| 4,535,878 | A | * | 8/1985 | Grahl | 190/1 |
| 4,553,785 | A | * | 11/1985 | Duke et al. | 297/229 |
| 4,689,844 | A | * | 9/1987 | Alivizatos | 5/702 |
| D362,579 | S | * | 9/1995 | Short | D6/601 |
| 5,528,784 | A | * | 6/1996 | Painter | 5/640 |
| 5,899,529 | A | | 5/1999 | Chaucer | |
| 5,987,676 | A | * | 11/1999 | Littleford et al. | 5/636 |
| 6,079,599 | A | * | 6/2000 | Nordstrom et al. | 224/153 |
| 6,267,638 | B1 | * | 7/2001 | Connolly et al. | 446/73 |
| 6,415,466 | B1 | * | 7/2002 | Laiso | 5/485 |
| 6,561,582 | B1 | | 5/2003 | Steadman | |
| 6,702,379 | B2 | * | 3/2004 | Kain | 297/250.1 |
| 6,895,619 | B1 | * | 5/2005 | Lee | 5/636 |
| 6,901,617 | B2 | * | 6/2005 | Sprouse et al. | 5/654 |
| 7,065,814 | B2 | * | 6/2006 | Rutkowski | 5/655 |
| 2003/0205921 | A1 | * | 11/2003 | McConnell et al. | 297/256.16 |
| 2004/0075315 | A1 | * | 4/2004 | Patrick | 297/219.1 |
| 2005/0012372 | A1 | * | 1/2005 | Baloga et al. | 297/256.15 |

OTHER PUBLICATIONS

Photograph and Description of Safefit® car Seat Leveler™, Blue Ridge International Products Company, 2 pp. available prior to Mar. 15, 2005.
Photograph and Description of Sit-Rite™, Sunshine Kids Juvenile Products, 2 pp., available prior to Mar. 15, 2005.

* cited by examiner

*Primary Examiner*—David Dunn
*Assistant Examiner*—Tania Abraham
(74) *Attorney, Agent, or Firm*—Lempià Braidwood LLC (57) ABSTRACT

A recline adjustment apparatus locatable on a vehicle seat to control a recline angle of a rearwardly-facing child car seat relative to the vehicle seat. The apparatus includes a cover to be placed on the vehicle seat. The apparatus further includes a recline adjuster. The recline adjuster also includes a plurality of height creation pockets coupled to the cover, and a plurality of bolsters sized to be inserted into and removed from respective ones of the height creation pockets. The height creation pockets are arranged so that insertion of selected ones of the bolsters into respective ones of the height creation pockets controls a height of the recline adjustment section.

20 Claims, 7 Drawing Sheets

RECLINE ADJUSTMENT APPARATUS

FIELD OF THE INVENTION

The invention relates to a recline adjustment apparatus. More specifically, the invention relates to a recline adjustment apparatus for a rearwardly-facing child vehicle seat.

BACKGROUND OF THE INVENTION

During proper installation of a rearwardly-facing child car seat (RFCCS) in an automobile, the car seat recline angle should be approximately 45 degrees relative to the vehicle seat. This angle optimizes child comfort. Child car seats and vehicle seats have different angles. The slope of the vehicle seat may raise the back of the child car seat too much, putting the infant in an upright rather than reclined position. For example, a caregiver may install a child car seat in a vehicle correctly, except to find that the seats of the vehicle are at such a steep angle that the child car seat is not oriented at the optimal 45-degree recline angle.

Child car seat manufacturers have tried to ensure that the child car seat can be installed at a 45 degree recline angle by building in an angle-adjusting foot into the child car seats. In some cases, the angle to which a child car seat can be adjusted is still not sufficient to provide an optimal 45 degree recline angle. The National Highway Transportation Safety Administration (NHTSA) recommends that the caregiver use rolled up towels or extruded foam (float noodles) to adjust the angle of the child car seat. However, rolled up towels or float noodles can leave a large margin of error during the installation of the child car seat. Furthermore, the towels may not be rolled up tight enough, which could lead to shifting. Moreover, both rolled up towels and float noodles can interfere with the straps that are used to secure the child car seat to the vehicle seat.

There are several conventional aftermarket products that are used to adjust the angle of a child car seat. One aftermarket product is basically an oversized (diameter) float noodle with a cylindrical cross-section. This product provides only one fixed adjustment angle. Once the child grows out of the child car seat, the product becomes obsolete and is removed from the vehicle, at which point it can be easily misplaced. Also, the product is made of closed cell foam. The foam is exposed; therefore, the child can pick at the foam and possibly ingest it, which can result in serious complications for the child.

Another aftermarket product is an oversized float noodle with a triangular cross-section. The three irregular sides of the triangle allow the caregiver to rotate the product to three different positions, giving the consumer the ability to adjust the child car seat to three different fixed angles. Again, once the child grows out of the child car seat, the product becomes obsolete and is removed from the vehicle, at which point it can be easily misplaced. This product is also made of closed cell foam, which has similar safety problems as discussed earlier.

Thus, there is a need for an angle adjuster for a rearwardly-facing child car seat that allows for different recline angles for different types and sizes of child car seats and vehicle seats.

SUMMARY OF THE INVENTION

An aspect of the present invention relates to a recline adjustment apparatus locatable on a vehicle seat to control a recline angle of a rearwardly-facing child car seat relative to the vehicle seat. The apparatus includes a cover to be placed on the vehicle seat. The apparatus also includes a recline adjuster. The recline adjuster includes a plurality of height creation pockets coupled to the cover. The recline adjuster also includes a plurality of bolsters sized to be inserted into and removed from respective ones of the height creation pockets. The height creation pockets are arranged so that insertion of selected ones of the bolsters into respective ones of the height creation pockets controls a height of the recline adjuster.

Another aspect of the present invention relates to a recline adjustment apparatus locatable on a vehicle seat to control a recline angle of a rearwardly-facing child car seat relative to the vehicle seat. The apparatus includes a vehicle seat protector and a recline adjuster coupled to the vehicle seat protector. The vehicle seat protector has a surface area greater than a footprint of the child car seat.

A further aspect of the invention relates to a recline adjustment apparatus locatable on a vehicle seat to control a recline angle of a rearwardly-facing child car seat relative to the vehicle seat. The apparatus includes a rollable cover to be placed on the vehicle seat, the rollable cover having an end that can be turned over and formed into a roll, the rollable cover also having an unrolled section. The rollable cover is adapted to be located on the vehicle seat, with the roll at a seat bight area of the vehicle seat, to enable the child car seat, when placed on the rollable cover, to recline at a predetermined recline angle relative to a seat bottom of the vehicle seat.

A still further aspect of the invention relates to a recline adjustment apparatus locatable on a vehicle seat to control a recline angle of a rearwardly-facing child car seat relative to the vehicle seat. The apparatus includes a cover to be placed on the vehicle seat. The apparatus also includes an inflatable bladder provided on the cover. The inflatable bladder is adapted to be placed in a seat bight area of the vehicle seat and to be inflated up to a predetermined amount to set the recline angle of the child car seat.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION

Reference will now be made in detail to embodiments of the invention, examples of which are illustrated in the accompanying drawings. An effort has been made to use the same reference numbers throughout the drawings to refer to the same or like parts.

FIGS. 1-4 illustrate different configurations of a recline adjustment apparatus for a rearwardly-facing child car seat according to an embodiment of the invention. The recline adjustment apparatus can be used to control a recline angle of the child car seat relative to the vehicle seat. The recline adjustment apparatus includes a cover to be placed on the vehicle seat. The recline adjustment apparatus also includes a recline adjuster. The recline adjuster can include a plurality of height creation pockets coupled to the cover, and a plurality of bolsters sized to be inserted into and removed from respective ones of the height creation pockets. The height creation pockets are arranged so that insertion of selected ones of the bolsters into respective ones of the height creation pockets controls a height of the recline adjuster. The recline adjustment apparatus allows for a plurality of different angle adjustments to suit different types of child car seats and vehicle seats, while also providing a protective cover for the vehicle seat.

Figure 1:
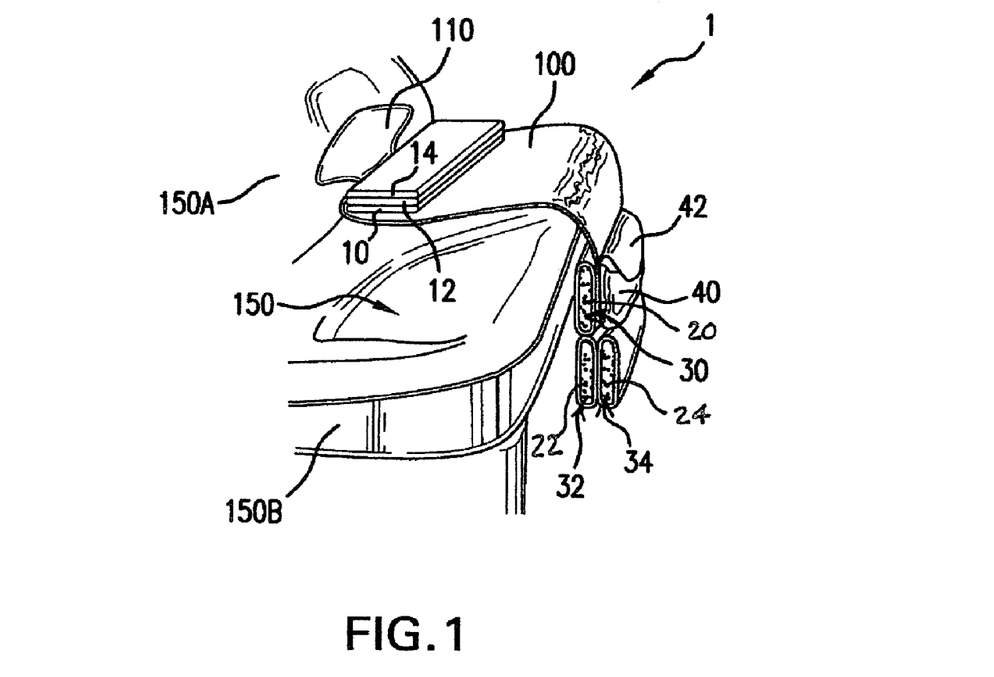
FIGS. 1-4 are perspective views of a first embodiment of a recline adjustment apparatus, showing four different angle adjustment modes.
Figure 4:
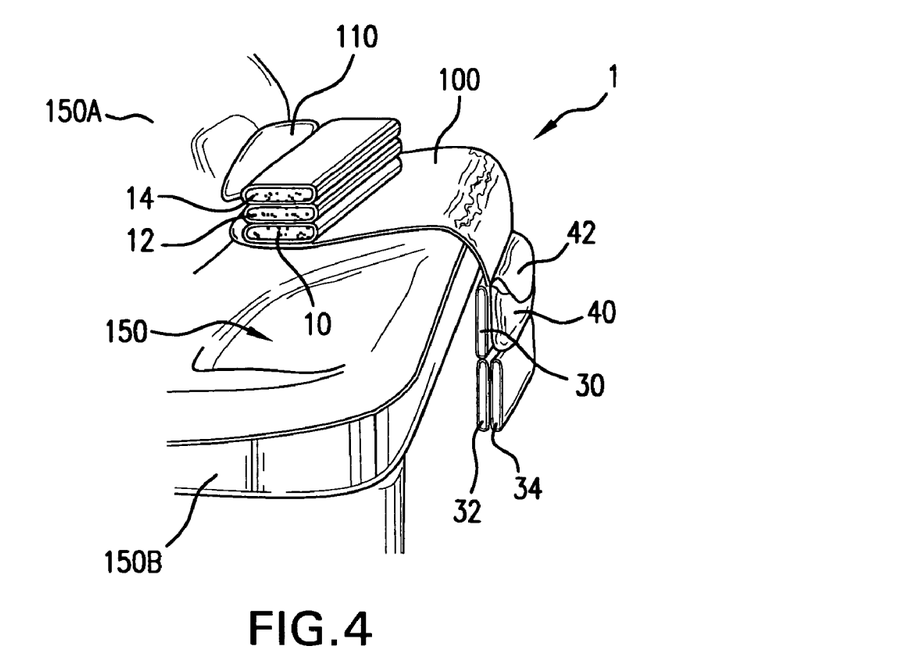

In more detail, the recline adjustment apparatus 1 includes a cover 100 to be placed on a vehicle seat. The cover 100 can double as a substrate for the bolsters and height-creation pockets, as well as a vehicle seat protector. The recline adjustment apparatus 1 also includes three rectangular cross-section bolsters, or adjustment inserts, which stably connect to the cover 100. The bolsters can be nested on top of one another, as shown in FIG. 4. FIG. 1 shows a case in which no angle adjustment is made. A caregiver can stack the bolsters until the child car seat is at a desired recline angle. The bolsters can be stored in storage pockets coupled to the cover 100 when not in use. Therefore, the bolsters are unlikely to be misplaced when they are not being used to provide a desired recline angle for a child car seat. The bolsters are designed to not interfere with seatbelt or latch installation. Each bolster can include bolster filling encapsulated in soft goods (e.g., leather or plastic or cloth covering with a zippered end to allow filling, such as foam, to be inserted within the covering).

In a first embodiment, as shown in FIGS. 1-4, one, two or three bolsters may be fitted into first, second and third height creation pockets 10, 12, 14 at a top portion of the cover 100, respectively, to create a desired offset for then placing a child car seat on a vehicle seat 150 with the cover 100 disposed therebetween. The vehicle seat 150 includes a vehicle seat back 150A and a vehicle seat bottom 150B. The height creation pockets 10, 12, 14 can be positioned at or near where the vehicle set back 150A intersects the vehicle seat bottom 150B, often referred to as the vehicle seat bight.

FIG. 1 shows a first configuration of the recline angle adjuster 1, where none of the height creation pockets 10, 12, 14 contains bolsters. This corresponds to a "zero angle adjustment" configuration. In FIG. 1, three bolsters 20, 22, 24 are fitted into three storage pockets 30, 32, 34, respectively, at a bottom portion of the cover 100. The storage pockets 30, 32, 34 and the height creation pockets 10, 12, 14 are preferably of a same shape as the bolsters. The storage pockets 30, 32, 34 do not rest on the vehicle seat bottom 150B, but rather hang down from the vehicle seat bottom 150B to rest at or just above the vehicle compartment floor. The cover 100 has a length sufficient (e.g., 5'-6') to ensure that such a configuration can occur for various types of vehicle seats.

In the first embodiment, the bolsters have a rectangular cross-sectional shape, which is the same cross-sectional shape as the pockets. Additionally, each of the pockets 10, 12, 14, 30, 32, 34 preferably is sized so that one bolster snugly fits within one pocket. Each pocket preferably includes an elastic band at a receiving portion thereof, so that the pocket can readily receive the bolster and can then collapse down on the bolster, to thereby secure the bolster in place within the pocket. If different shaped bolsters are used (e.g., triangular cross-sectional shaped, trapedozial cross-sectional shaped), the pockets can be shaped substantially similar to the bolsters.

As seen in FIGS. 1-4, a flap 110 is provided at a top edge of the cover 100. The flap 110 can rest against the vehicle seat back 150A and provide a protective covering for when the child car seat is strapped onto the vehicle seat 150. The flap 110 can cover an area on the vehicle seat back 150A of between 6" to 18" above the bight of the vehicle seat 150. Due in part to the flap 110, no part of the child car seat makes direct contact with the vehicle seat 150. To accomplish this, the cover 100 is sized so that it is larger than a standard "footprint" of a child car seat. A footprint of a child car seat corresponds to that portion of the child car seat that comes into direct contact with the vehicle seat 150. By way of example and not by way of limitation, if a child car seat had a footprint of not less than 8"×8", or not less than 9"×9", or not less than 11"×18", then the cover 100 would have a greater size (e.g., 20%-50% greater) than the footprint.

The storage pockets 30, 32, 34 in FIG. 1 each are filled with a bolster, since none of the height creation pockets 10, 12, 14 is filled with a bolster. The storage pockets 30, 32, 34 are disposed adjacent to a vehicle compartment floor when the recline angle adjuster 1 is properly placed on the vehicle seat 150. The configuration shown in FIG. 1 has a first storage pocket 30 provided directly above a second storage pocket 32 on an inner surface (the surface facing the vehicle seat 150) of the cover 100, and a third storage pocket 34 provided opposite the second storage pocket 32 on an outer surface of the cover 100. Other configurations of the storage pockets 30, 32, 34 are contemplated. For example, all storage pockets can be stacked one above the other on either the inner or outer surface of the cover 100, or two storage pockets can be on the outer surface and one storage pocket can be on the inner surface of the cover 100.

The cover 100 can be a fabric cover, such as a nylon or rayon or cloth cover, and the pockets 10, 12, 14, 30, 32, 34 can be sewn in place on the cover 100. In other possible configurations, each pocket includes a VELCRO™ pad so that it can be releasably attached to the cover 100 (with its own mating VELCRO™ pads provided at different locations on the cover 100).

Still further, the cover 100 includes a storage pocket 40. The storage pocket 40 includes a flap 42, so that the storage pocket 40 can be closed (e.g., via VELCRO™ pads on the flap 42 and on the outer surface of the storage pocket 40), so that a child will not have access to items stored within the storage pocket 40. The storage pocket 40 may store essential child items, such as diapers, baby bottles, pacifiers, for example. In FIGS. 1-4, the storage pocket 40 is disposed directly above the third storage pocket 34, but other configurations and placement locations of the storage pocket 40 are contemplated.

Figure 2:
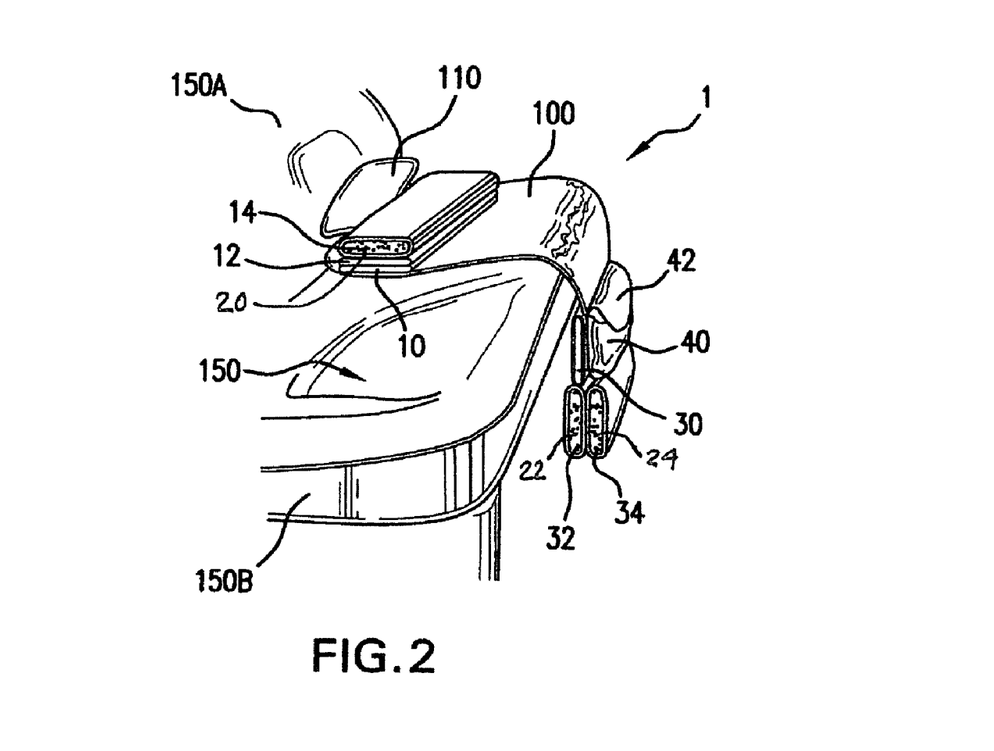

FIG. 2 shows a second configuration of the recline angle adjuster 1, in which the bolster that had been stored in the first storage pocket 30 is moved into the third height creation pocket 14. This corresponds to a "minimal angle adjustment" for the recline angle adjuster 1. The bolster could have been removed from any one of the storage pockets 30, 32, 34, and placed in any one of the height creation pockets 10, 12, 14, to create the minimal angle adjustment configuration.

Figure 3:
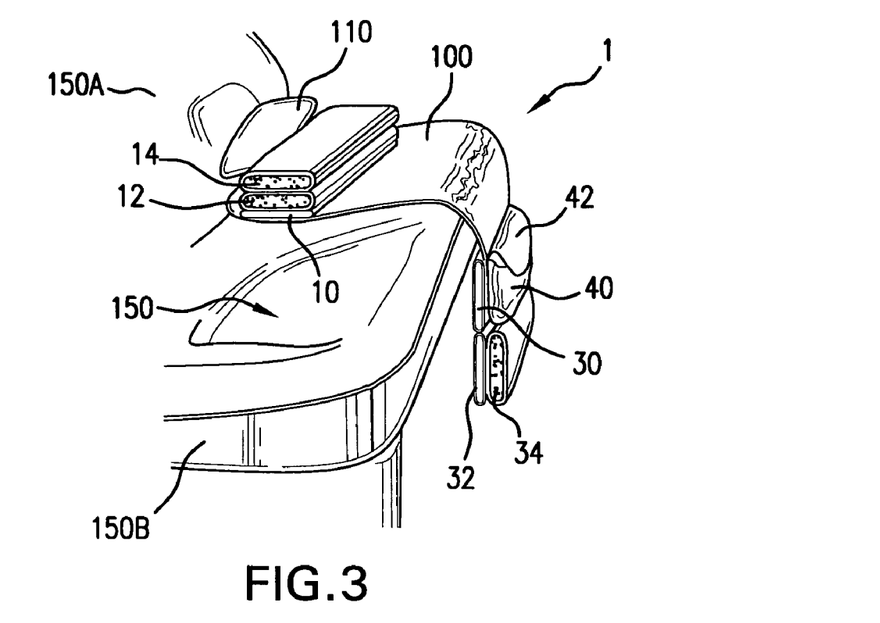

FIG. 3 shows a third configuration of the recline angle adjuster 1, in which the bolsters that had been stored in the first and second storage pockets 30, 32 are moved into the second and third height creation pockets 12, 14. This corresponds to a "medium angle adjustment" for the recline angle adjuster 1. The two bolsters could have been removed from any two of the storage pockets 30, 32, 34, and placed in any two of the height creation pockets 10, 12, 14, to create the medium angle adjustment configuration.

FIG. 4 shows a fourth configuration of the recline angle adjuster 1, in which the bolsters that had been stored in the first, second and third storage pockets 30, 32, 34 are moved into the first, second and third height creation pockets 10, 12, 14. This corresponds to a "maximum angle adjustment" for the recline angle adjuster 1. Based on the size and other characteristics of the child car seat that is be secured to the vehicle seat 150, it is likely that one of the four possible configurations of the recline angle adjuster 1, as discussed above, will provide the desired 45 degree angular incline for the child car seat.

Figure 5:
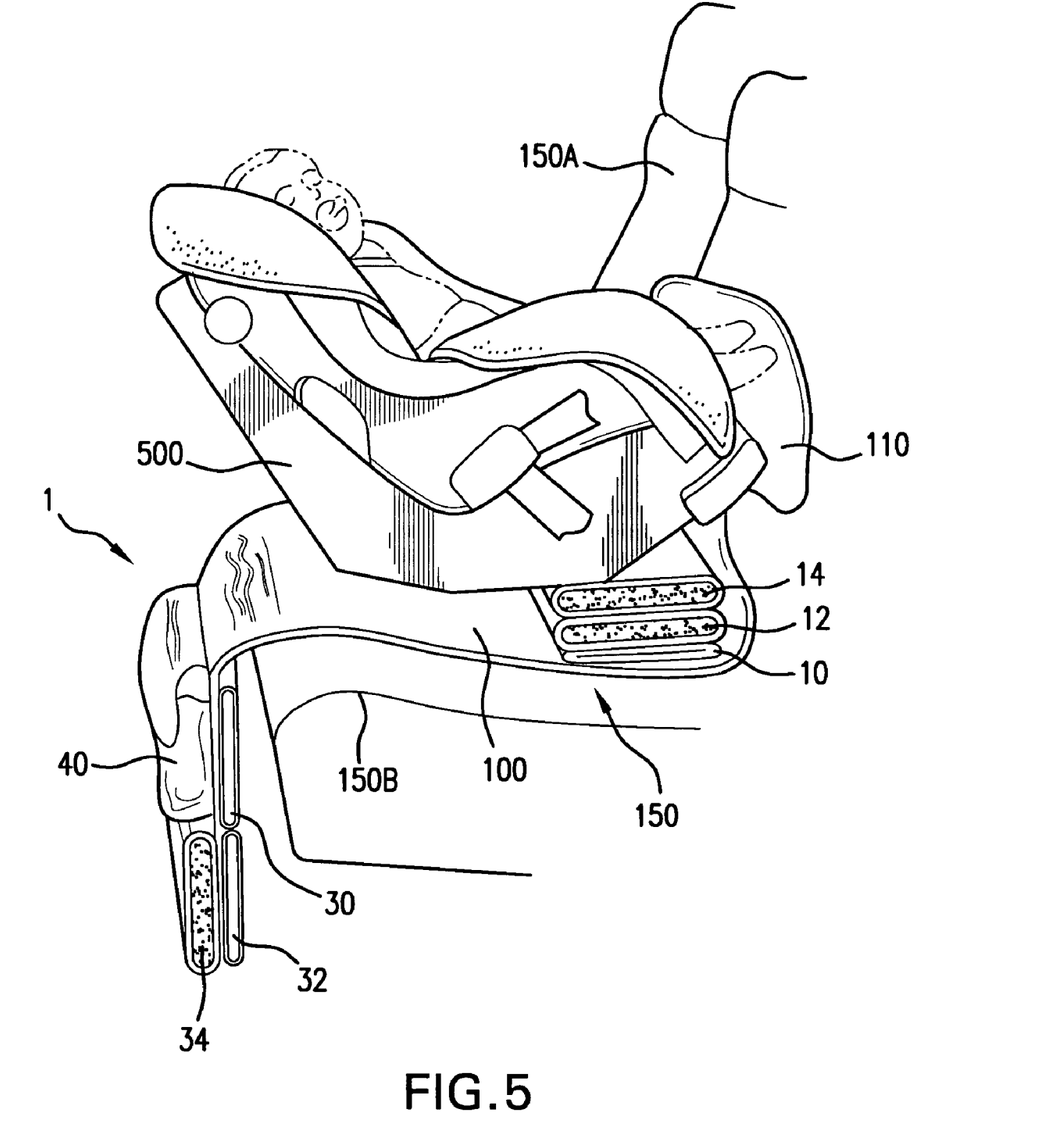
FIG. 5 is a side view of the recline adjustment apparatus used to provide angle adjustment for a child car seat.

FIG. 5 shows a child car seat 500 strapped onto a vehicle seat 150, in which the recline angle adjuster 1 is in its "medium angle adjustment" configuration. The flap 110 is disposed between a front portion of the child car seat 500 that would otherwise be in direct contact with the vehicle seat back 150A of the vehicle seat 150. This provides protection for the vehicle seat 150, so that it will not break down or discolor over time due to the stresses provided on it by the foot of the child car seat 500 pressing hard against the vehicle seat 150. Additionally, the recline angle adjuster 1 provides a function for keeping the vehicle seat 150 clean. For example, in a case where the child spills food from his/her child car seat, cover 100 of the recline angle adjuster 1 will likely receive and hold the spill, and thereby keep the vehicle seat 150 clean.

Figure 6:
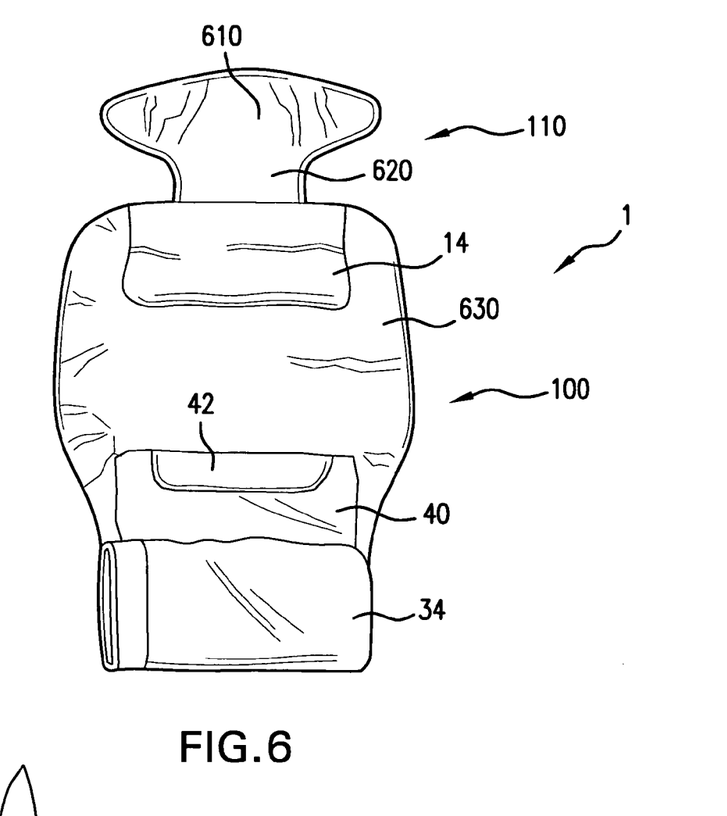
FIG. 6 is a top plan view of the recline adjustment apparatus.

FIG. 6 is a top plan view of the recline angle adjuster 1 according to the first embodiment. The protection flap 110 is provided at a edge of the cover 100, and is shown having an oval (or oblong) portion 610, and a neck portion 620 between the oval portion 610 and the main body 630 of the cover 100. Other flap shapes are contemplated, for example, rectangular and elliptical. The third height creation pocket 14 is shown in FIG. 6 at the top portion of the main body 630; the first and second height creation pockets 10, 12 are not shown since they are disposed directly underneath the third height creation pocket 14. The main body 630 can have a substantially rectangular shape. The storage pocket 40 with its flap 42 can be provided at a lower portion of the main body 630. The third storage pocket 34 is shown in FIG. 6, and the first and second storage pockets 30, 32 are hidden from view since they are disposed on an opposite surface of the cover 100.

Figure 7:
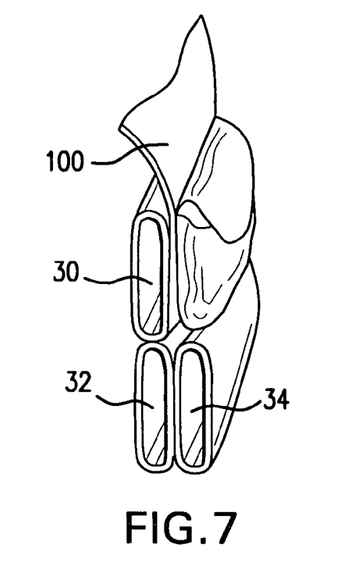
FIG. 7 is a detailed perspective view of storage pockets of the recline adjustment apparatus.
Figure 8:
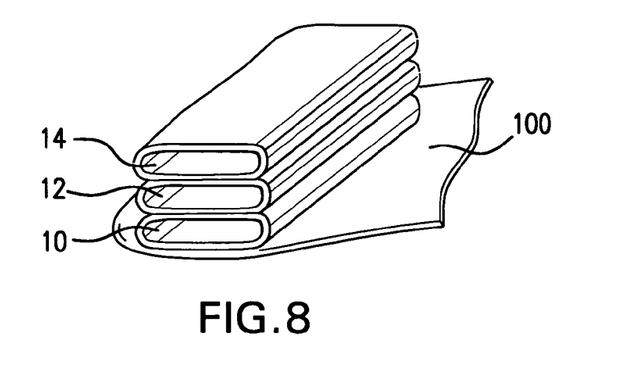
FIG. 8 is a detailed perspective view of height creation pockets of the recline adjustment apparatus.

FIGS. 7 and 8 respectively show detail views of the storage pockets 30, 32, 34 and the height creation pockets 10, 12, 14. The storage pockets 30, 32, 34 can have a shape substantially the same as the bolsters. A user need not worry about losing the bolsters, since the bolsters can easily be stored in the storage pockets 30, 32, 34 when the recline angle adjuster 1 is not being used to provide an angle adjustment for a child car seat. Similarly, the height creation pockets 10, 12, 14 can have a shape substantially the same as the bolsters. The height creation pockets 10, 12, 14 can be disposed in a three-tiered construction, one directly above the other. The first height creation pocket 10 can be sewn in place onto the cover 100, and the other height creation pockets can be sewn in place with respect to their adjacently-positioned height creation pockets. The cover 100 also provides a vehicle seat protector capability.

Figure 9:
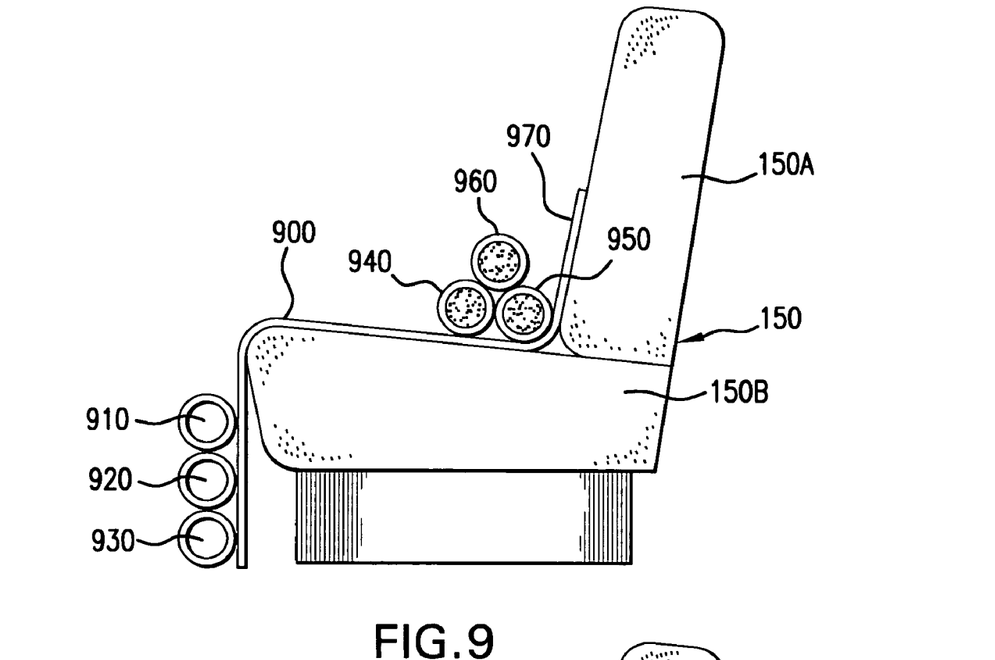
FIG. 9 is a side elevational view of a recline adjustment apparatus according to a second embodiment.

FIG. 9 shows a recline angle adjuster 900 according to a second embodiment of the invention. The recline angle adjuster 900 is configured to use circular-shaped bolsters (in cross section), or noodles, to provide a desired angle adjustment for a child car seat, whereby recline angle adjuster 1 according to the first embodiment is configured to use rectangular-shaped (in cross section) bolsters.

In more detail, FIG. 9 shows three storage pockets 910, 920, 930 provided on a bottom portion of the recline angle adjuster 900. Other types of configurations of the storage pockets 910, 920, 930 beyond the one-atop-the-other configuration are contemplated. Three height creation pockets 940, 950, 960 are provided at a top edge of the recline angle adjuster 900. The first and second height creation pockets 940, 950 form a first level of an angle-adjusting triangular structure, and the third height creation pocket 960 forms a second level of the angle-adjusting triangular structure.

FIG. 9 shows a maximum angle adjustment configuration of the recline angle adjuster 900, in which all three height creation pockets 940, 950, 960 are filled with circular-shaped bolsters. For a "first medium angle adjustment" configuration, only the second height creation pocket 950 is filled with a bolster. For a "second medium angle adjustment" configuration, both the first and second height creation pockets 940, 950 are filled with a bolster. For a "zero angle adjustment" configuration, none of the height creation pockets 940, 950, 960 is filled with a bolster. Also, a protective flap 970 may be provided at a top edge of the recline angle adjuster 900, in a manner similar to the first embodiment.

Figure 10:
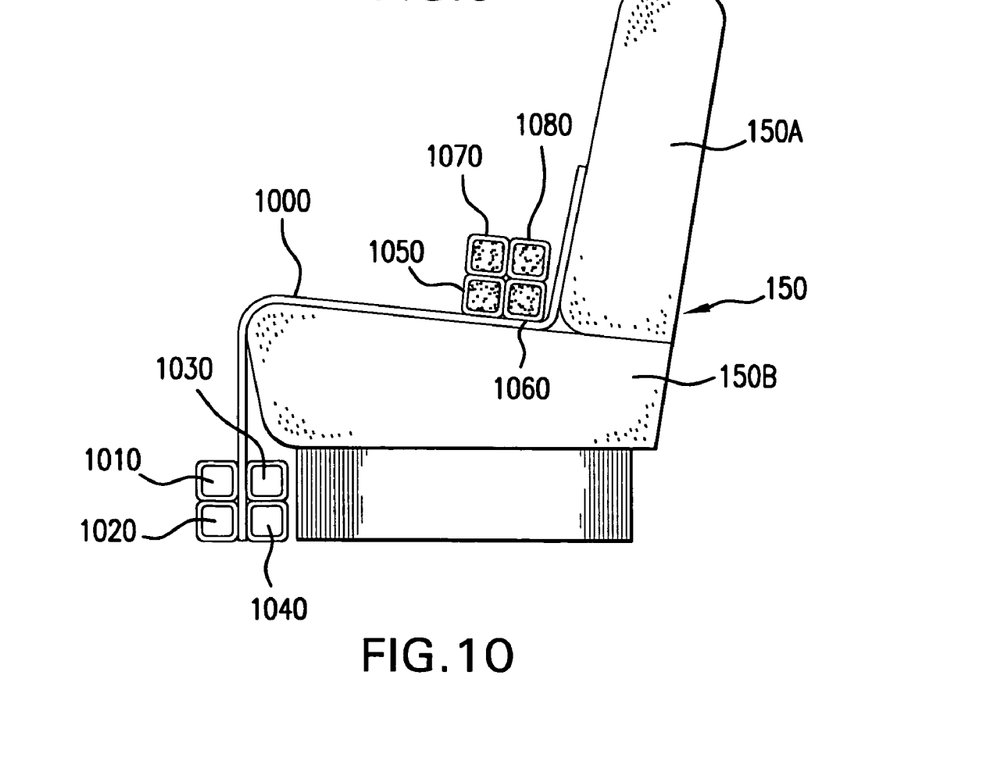
FIG. 10 is a side elevational view of a recline adjustment apparatus according to a third embodiment.

FIG. 10 shows a recline angle adjuster 1000 according to a third embodiment of the invention. The recline angle adjuster 1000 is configured to use square-shaped (in cross section) bolsters to provide a desired angle adjustment for a child car seat. Unlike the other described embodiments, the third embodiment includes four storage pockets 1010, 1020, 1030, 1040, and four height creation pockets 1050, 1060, 1070, 1080. FIG. 10 shows a configuration in which all four of the height creation pockets 1050, 1060, 1070, 1080 are filled with bolsters. Other configurations may be utilized to create different recline angle adjustments for a child car seat.

Figure 11A:
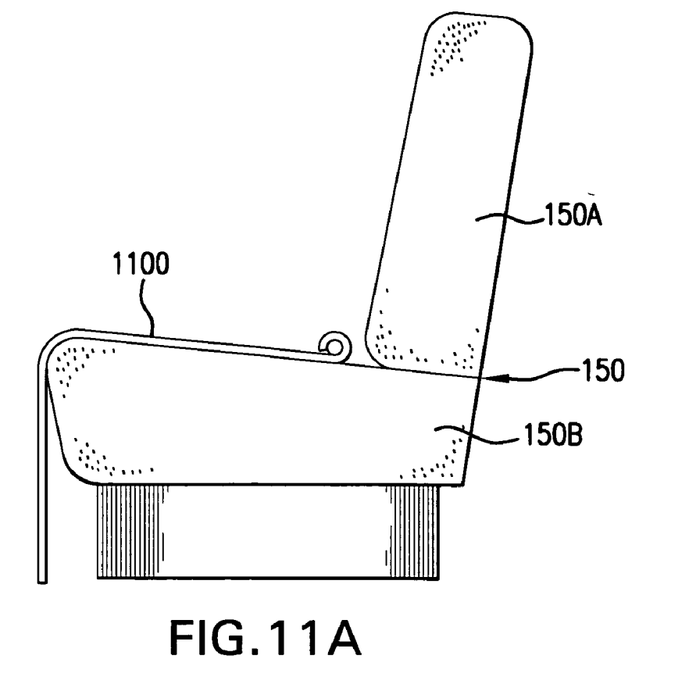
FIGS. 11A and 11B are side elevational views of a recline adjustment apparatus according to a fourth embodiment, showing two different angle adjustment modes.
Figure 11B:
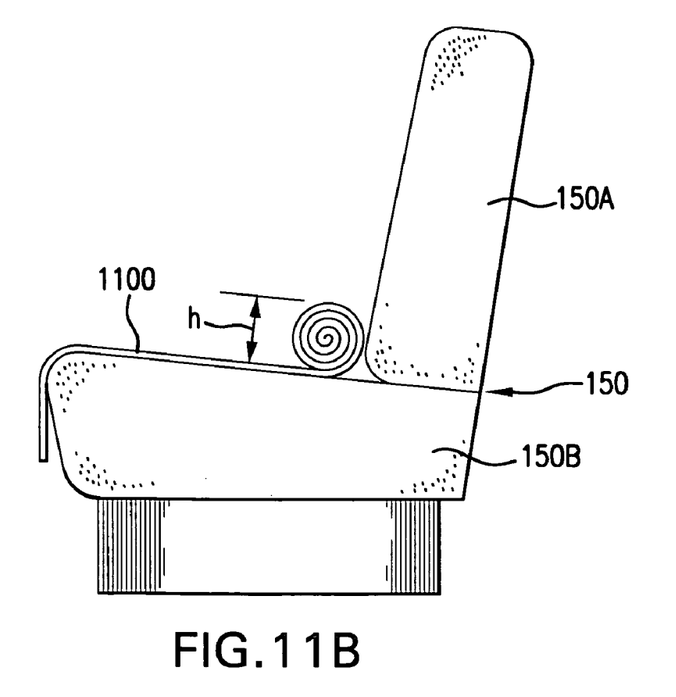

FIGS. 11A and 11B show a recline angle adjuster 1100 according to a fourth embodiment of the invention. FIG. 11A shows the recline angle adjuster 1100 in a low angle adjustment configuration, and FIG. 11B shows the recline angle adjuster 1100 in a high angle adjustment configuration. The recline angle adjuster 1100 can have a fabric cover that has a larger footprint than a child car seat for which it provides a recline angle adjustment. The recline angle adjuster 1100 can be easily rolled up, to provide for a desired amount of recline angle. The recline angle adjuster 1100 is preferably of a length such that it will cover the vehicle seat bottom 150B of a standard vehicle seat 150 even when the recline angle adjuster 1100 is rolled up by a maximum rolled amount. For example, the recline angle adjuster 1100 can be rolled up to provide at least a rolled portion height "h" of 8" above the unrolled height of the recline angle adjuster 1100. Also, the recline angle adjuster 1100 has a width such that it does not cover or otherwise interfere with anchors or seat belts on the vehicle seat 150 that are used to attach the child car seat to the vehicle seat 150. The recline angle adjuster 1100 can have a length such that, in the maximum rolled state (e.g., a state such that the rolled portion is 8"-10" high), the unrolled portion of the recline angle adjuster 1100 spans the entire length of the vehicle seat bottom 150B, in order to provide a cover between the vehicle seat 150 and the child car seat. The thickness of the recline angle adjuster 1100 is preferably greater than ½" and less than 1½". With such a thickness, it will not be too thin, which might otherwise require too many rolls in order to obtain a desired height of the rolled portion of the recline angle adjuster 1100, and also it will not be too thick, which might otherwise impair achieving a desired recline angle.

Figure 12A:
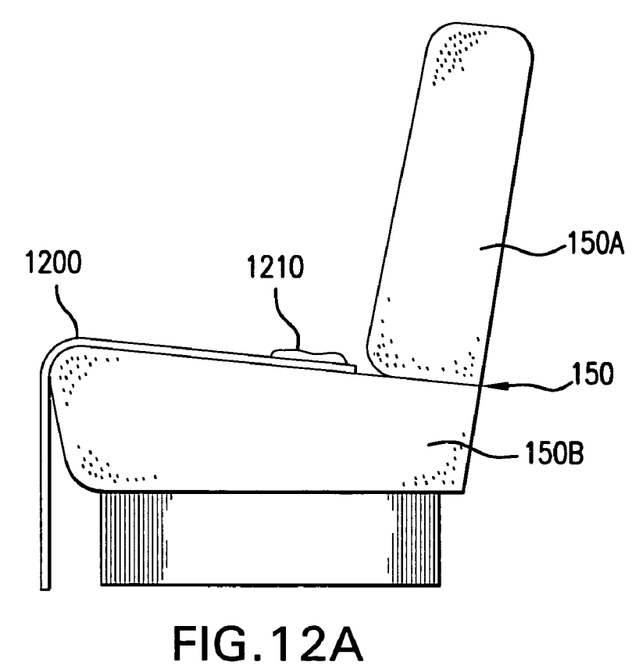
FIGS. 12A and 12B are side elevational views of a recline adjustment apparatus of a fifth embodiment, showing two different angle adjustment modes.
Figure 12B:
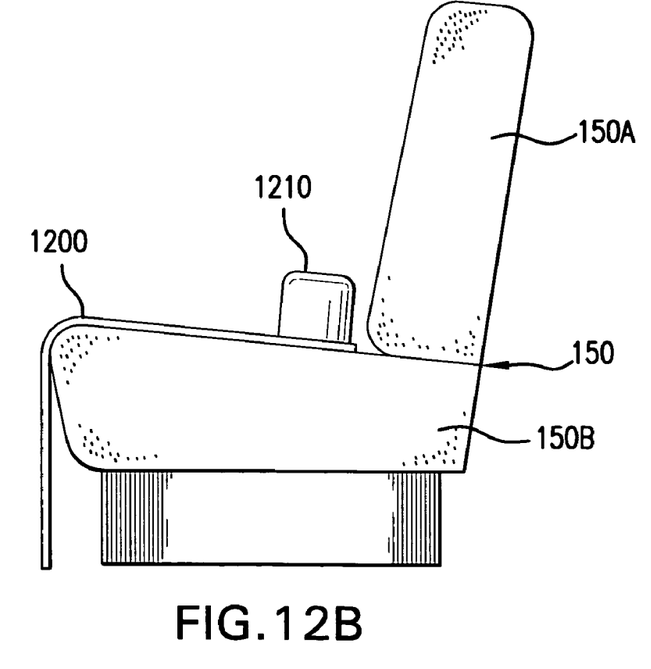

FIGS. 12A and 12B show a recline angle adjuster 1200 according to a fifth embodiment of the invention. FIG. 12A shows the recline angle adjuster 1200 in a zero angle adjustment configuration, and FIG. 12B shows the recline angle adjuster 1200 in a maximum angle adjustment configuration. The recline angle adjuster 1200 can include a bladder 1210 at a top portion of the recline angle adjuster 1200. The bladder 1210 is capable of being completely filled with air to provide a maximum angle adjustment configuration, as shown in FIG. 12B, or it can be partially filled with air to provide an intermediate angle adjustment configuration (not shown), or it can be not filled with any air to provide a zero angle adjustment configuration, as shown in FIG. 12A. The mechanism to fill the bladder 1210 with air and to remove air from the bladder 1210 can be by any of a variety of mechanisms known to those skilled in the art, such as a bellows-type mechanism and/or a valve stem to add air to or to release air from the bladder 1210. The recline angle adjuster 1200 can be a fabric or plastic construction. The bladder 1210 is constructed such that strong forces exerted thereon, such as forces due to a vehicle crash, for example, will not cause the bladder 1210 to burst, and thereby change (lower) the angular position of the child car seat.

The embodiments described above have been set forth herein for the purpose of illustration. This description, however, should not be deemed to be a limitation on the scope of the invention. Various modifications, adaptations, and alternatives may occur to one skilled in the art without departing from the claimed inventive concept. For example, while the various embodiments have been described having either 3 or 4 storage pockets and having either 3 or 4 height creation pockets, other numbers of such pockets (e.g., 2, 5, 6, . . . ) may be contemplated. Also, in another possible embodiment, instead of having pockets in which bolsters are to be inserted for storage of for use as angle adjusters, the bolsters themselves are provided with VELCRO™ pads at an outer surface thereof, so that the bolsters are capable of being attached to a top portion of a cover (having a mating VELCRO™ pad at that location) and to each other, in order to obtain a desired recline angle adjustment for a rearwardly-facing child car seat. Similarly, those pockets can be stored at a storage end of the cover, using the VELCRO™ pads on the bolsters and mating VELCRO™ pads on a bottom portion of the cover. Further, in yet another possible embodiment, a strap, such as a nylon strap, can be provided to secure a desired number of bolsters to a cover to obtain a desired recline angle adjustment. The nylon strap can be attached to the cover by VELCRO™ pads on the strap and mating VELCRO™ pads on the cover, for example. The scope and spirit of the invention are indicated by the following claims.

What is claimed is:

1. A recline adjustment apparatus locatable on a vehicle seat to control a recline angle of a rearwardly-facing child car seat relative to the vehicle seat, the apparatus comprising:
a cover to be placed on the vehicle seat having a first surface and a second surface opposite the first surface; and
a recline adjuster including
a plurality of height creation pockets coupled to one end of the cover;
a plurality of bolsters sized to be inserted into and removed from respective ones of the height creation pockets;
a plurality of storage pockets coupled to an end of the cover opposite the plurality of height creation pockets, each of the plurality of storage pockets being adapted to store one of the plurality of bolsters, wherein the plurality of storage pockets includes a first storage pocket and a second storage pocket the first and second storage pockets located on the first surface of the cover, and a third storage pocket located on the second surface of the cover,
wherein the height creation pockets are arranged so that insertion of selected ones of the bolsters into respective ones of the height creation pockets controls a height of the recline adjuster, and wherein at least a substantial part of the cover has no height creation pockets and has no storage pockets.

2. The apparatus according to claim 1, wherein the plurality of height creation pockets comprise:
a first height creation pocket provided directly on the one end of the cover; and
a second height creation pocket disposed directly on the first height creation pocket.

3. The apparatus according to claim 2, further comprising: a third height creation pocket disposed directly on the second height creation pocket.

4. The apparatus according to claim 1, wherein the cover is a fabric cover.

5. The apparatus according to claim 1, wherein each of the height creation pockets has an in-use state that is substantially the same as a shape of at least one of the plurality of bolsters.

6. The apparatus according to claim 1, wherein the plurality of storage pockets and the plurality of height creation pockets are sewn to the cover.

7. The apparatus according to claim 1, further comprising:
a flap extending from a part of the apparatus adjacent the recline adjuster, the flap being configured to fit between the vehicle seat and the child car seat when the child car seat is attached to the vehicle seat.

8. The apparatus according to claim 7, wherein the flap comprises:
a neck portion; and
an oblong portion,
wherein the neck portion has a lesser width than the oblong portion.

9. The apparatus according to claim 1, wherein the cover is sized such that, when fitted onto the vehicle seat, the plurality of storage pockets hang over a front edge of the vehicle seat and are closer to a floor of the vehicle than to a back portion of the vehicle seat and the plurality of height creation pockets rest on a seat portion of the vehicle seat that abuts the back portion of the vehicle seat.

10. The apparatus according to claim 9, wherein the cover is locatable on the vehicle set beneath the child seat such that the plurality of height creation pockets and the plurality of bolsters can be configured to selectively orient the child car seat at a predetermined angle with respect to the vehicle seat.

11. The apparatus according to claim 10, wherein the predetermined angle is approximately 45 degrees.

12. A recline adjustment apparatus locatable on a vehicle seat to control a recline angle of a rearwardly-facing child car seat relative to the vehicle seat, the apparatus comprising:
 a cover to be placed on the vehicle seat; and
 a recline adjuster including
  a plurality of height creation pockets coupled to the cover,
  a plurality of bolsters sized to be inserted into and removed from respective ones of the height creation pockets, and
  a plurality of storage pockets coupled to the cover and including:
  a first storage pocket provided directly on a first surface of the cover;
  a second storage pocket disposed above the first storage pocket on the first surface of the cover; and
  a third storage pocket disposed directly on a second surface of the cover that is opposite to the first surface of the cover
 wherein the height creation pockets are arranged so that insertion of selected ones of the bolsters into respective ones of the height creation pockets controls a height of the recline adjuster, and
 wherein each of the plurality of storage pockets is adapted to store one of the plurality of bolsters.

13. A recline adjustment apparatus locatable on a vehicle seat to control a recline angle of a rearwardly-facing child car seat relative to the vehicle seat, the apparatus comprising:
 a vehicle seat protector configured to rest on a seat bottom of the vehicle seat, the vehicle seat protector having a first surface and a second surface opposite the first surface;
 a recline adjuster including a plurality of height creation pockets coupled to one end of the vehicle seat protector, and
 a plurality of storage pockets connected to an end of the vehicle seat protector opposite the recline adjuster, the plurality of storage pockets including a first storage pocket and a second storage pocket the first and second storage pockets located on the first surface of the vehicle seat protector, and a third storage pocket located on the second surface of the vehicle seat protector,
 wherein the vehicle seat protector has a surface area sufficient to lie between the child seat and the seat bottom of the vehicle seat, and wherein a portion of the surface area of the vehicle seat protector is a generally flat, flexible material devoid of any part of the recline adjuster.

14. The apparatus according to claim 13, wherein the flat, flexible material portion is positioned between the plurality of height creation pockets and the plurality of storage pockets and is devoid of any of the height creation and storage pockets.

15. The apparatus according to claim 14, wherein the plurality of storage pockets and the plurality of height creation pockets are sewn to the vehicle seat protector.

16. The apparatus according to claim 14, wherein the vehicle seat protector is locatable on the vehicle seat beneath the child car seat such that the plurality of height creation pockets can be configured to selectively orient the child car seat at a predetermined angle when the child car seat is resting on the vehicle seat protector.

17. The apparatus according to claim 16, wherein the predetermined angle is approximately 45 degrees.

18. The apparatus according to claim 13 wherein the vehicle seat protector comprises a nylon cover.

19. The apparatus according to claim 13, wherein the vehicle seat protector further comprises:
 a flap extending from a part of the apparatus adjacent the recline adjuster, the flap being configured to fit between the child car seat and the vehicle seat when the child car seat is placed on the vehicle seat.

20. The apparatus according to claim 19, wherein the flap comprises:
 a neck portion; and
 an oblong portion,
 wherein the neck portion has a lesser width than the oblong portion.

* * * * *